US011157774B2

United States Patent
Dudzik et al.

(10) Patent No.: US 11,157,774 B2
(45) Date of Patent: Oct. 26, 2021

(54) DEPTH DATA MODEL TRAINING WITH UPSAMPLING, LOSSES, AND LOSS BALANCING

(71) Applicant: Zoox, Inc., Foster City, CA (US)

(72) Inventors: Thomas Oscar Dudzik, Burlington, CT (US); Kratarth Goel, Albany, CA (US); Praveen Srinivasan, San Francisco, CA (US); Sarah Tariq, Palo Alto, CA (US)

(73) Assignee: Zoox, Inc., Foster City, CA (US)

( * ) Notice: Subject to any disclaimer, the term of this patent is extended or adjusted under 35 U.S.C. 154(b) by 146 days.

(21) Appl. No.: 16/684,568

(22) Filed: Nov. 14, 2019

(65) Prior Publication Data
US 2021/0150279 A1    May 20, 2021

(51) Int. Cl.
*G06K 9/00* (2006.01)
*G06K 9/62* (2006.01)
(Continued)

(52) U.S. Cl.
CPC .......... *G06K 9/6259* (2013.01); *G01S 7/4808* (2013.01); *G01S 17/86* (2020.01);
(Continued)

(58) Field of Classification Search
CPC ............... G06K 9/6259; G06K 9/6292; G06K 9/00805; G06K 2209/21; G01S 17/86;
(Continued)

(56) References Cited

U.S. PATENT DOCUMENTS 9,826,216 B1 * 11/2017 Hazeghi ................. G02B 27/30
2009/0262974 A1 * 10/2009 Lithopoulos ......... G01C 21/206
382/100
(Continued)

FOREIGN PATENT DOCUMENTS

CN          109146944 A  *  1/2019
CN          109146944 A      1/2019
(Continued)

OTHER PUBLICATIONS

Office Action for U.S. Appl. No. 16/684,554, dated Apr. 5, 2021, Dudzik, "Depth Data Model Training", 11 pages.
(Continued)

*Primary Examiner* — Mahendra R Patel
(74) *Attorney, Agent, or Firm* — Lee & Hayes, P.C.

(57) ABSTRACT

Techniques for training a machine learned (ML) model to determine depth data based on image data are discussed herein. Training can use stereo image data and depth data (e.g., lidar data). A first (e.g., left) image can be input to a ML model, which can output predicted disparity and/or depth data. The predicted disparity data can be used with second image data (e.g., a right image) to reconstruct the first image. Differences between the first and reconstructed images can be used to determine a loss. Losses may include pixel, smoothing, structural similarity, and/or consistency losses. Further, differences between the depth data and the predicted depth data and/or differences between the predicted disparity data and the predicted depth data can be determined, and the ML model can be trained based on the various losses. Thus, the techniques can use self-supervised training and supervised training to train a ML model.

17 Claims, 7 Drawing Sheets

(51) Int. Cl.
  *G06T 3/00* (2006.01)
  *G06T 7/593* (2017.01)
  *G01S 7/48* (2006.01)
  *G01S 17/86* (2020.01)
  *G01S 17/931* (2020.01)

(52) U.S. Cl.
  CPC ........ *G01S 17/931* (2020.01); *G06K 9/00805* (2013.01); *G06K 9/6292* (2013.01); *G06T 3/0093* (2013.01); *G06T 7/593* (2017.01); *G06K 2209/21* (2013.01); *G06T 2207/10012* (2013.01); *G06T 2207/20081* (2013.01)

(58) Field of Classification Search
  CPC ............... G01S 17/931; G01S 7/4808; G06T 3/0093; G06T 7/593; G06T 2207/20081; G06T 2207/10012; G06T 2207/20084; G06T 2207/10028; G08T 7/593; H04N 2013/0081
  USPC ..................................................... 382/103
  See application file for complete search history.

(56) References Cited

U.S. PATENT DOCUMENTS

| | | | |
|---|---|---|---|
| 2015/0146103 A1 | 5/2015 | Koo et al. | |
| 2017/0192423 A1* | 7/2017 | Rust | G01C 21/3492 |
| 2019/0004533 A1* | 1/2019 | Huang | G06K 9/4628 |
| 2019/0026956 A1* | 1/2019 | Gausebeck | H04N 13/10 |
| 2019/0050000 A1* | 2/2019 | Kennedy | G06T 7/277 |
| 2019/0208181 A1* | 7/2019 | Rowell | H04N 5/23267 |
| 2019/0213481 A1* | 7/2019 | Godard | G06T 7/50 |
| 2019/0289281 A1* | 9/2019 | Badrinarayanan | G06T 5/50 |
| 2019/0295282 A1* | 9/2019 | Smolyanskiy | G01S 13/867 |
| 2019/0340775 A1* | 11/2019 | Lee | G06N 20/00 |
| 2020/0041276 A1* | 2/2020 | Chakravarty | G01C 21/32 |
| 2020/0050202 A1* | 2/2020 | Suresh | G06T 7/593 |
| 2020/0160537 A1* | 5/2020 | Urtasun | G06T 7/246 |
| 2020/0226419 A1* | 7/2020 | Knaan | G06K 9/6262 |
| 2020/0342652 A1* | 10/2020 | Rowell | G06K 9/6256 |
| 2021/0004660 A1* | 1/2021 | Ambrus | G06N 3/08 |
| 2021/0049757 A1* | 2/2021 | Zhu | G06T 7/32 |
| 2021/0088784 A1* | 3/2021 | Whitmire | G06F 3/013 |
| 2021/0118184 A1* | 4/2021 | Pillai | G06T 7/97 |
| 2021/0150278 A1 | 5/2021 | Dudzik et al. | |

FOREIGN PATENT DOCUMENTS

| | | | |
|---|---|---|---|
| CN | 110009700 A | * | 7/2019 |
| CN | 110175986 A | * | 8/2019 |
| CN | 110175986 A | | 8/2019 |

OTHER PUBLICATIONS

The PCT Search Report and Written Opinion dated Feb. 18, 2021 for PCT application No. PCT/US20/59686, 10 pages.

Kuznietsov et al., "Semi-Supervised Deep Learning for Monocular Depth Map Prediction", IEEE Intl Conf on Computer Vision and Pattern Recognition, CVPR Jul. 2017, 14 pgs.

Lee et al., "From Big to Small: Multi-Scale Local Planar Guidance for Monocular Depth Estimation", Published in ArXiv:1907.10326, Aug. 2019, Computer Vision and Pattern Recognition, 10 pgs.

* cited by examiner

DEPTH DATA MODEL TRAINING WITH UPSAMPLING, LOSSES, AND LOSS BALANCING

BACKGROUND

A vehicle can use sensors to capture sensor data to detect objects in an environment. Accurate and precise sensor data can assist, for example, an autonomous vehicle, to traverse the environment. In some instances, the sensors may have limited range and/or provide low density of data associated with the environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
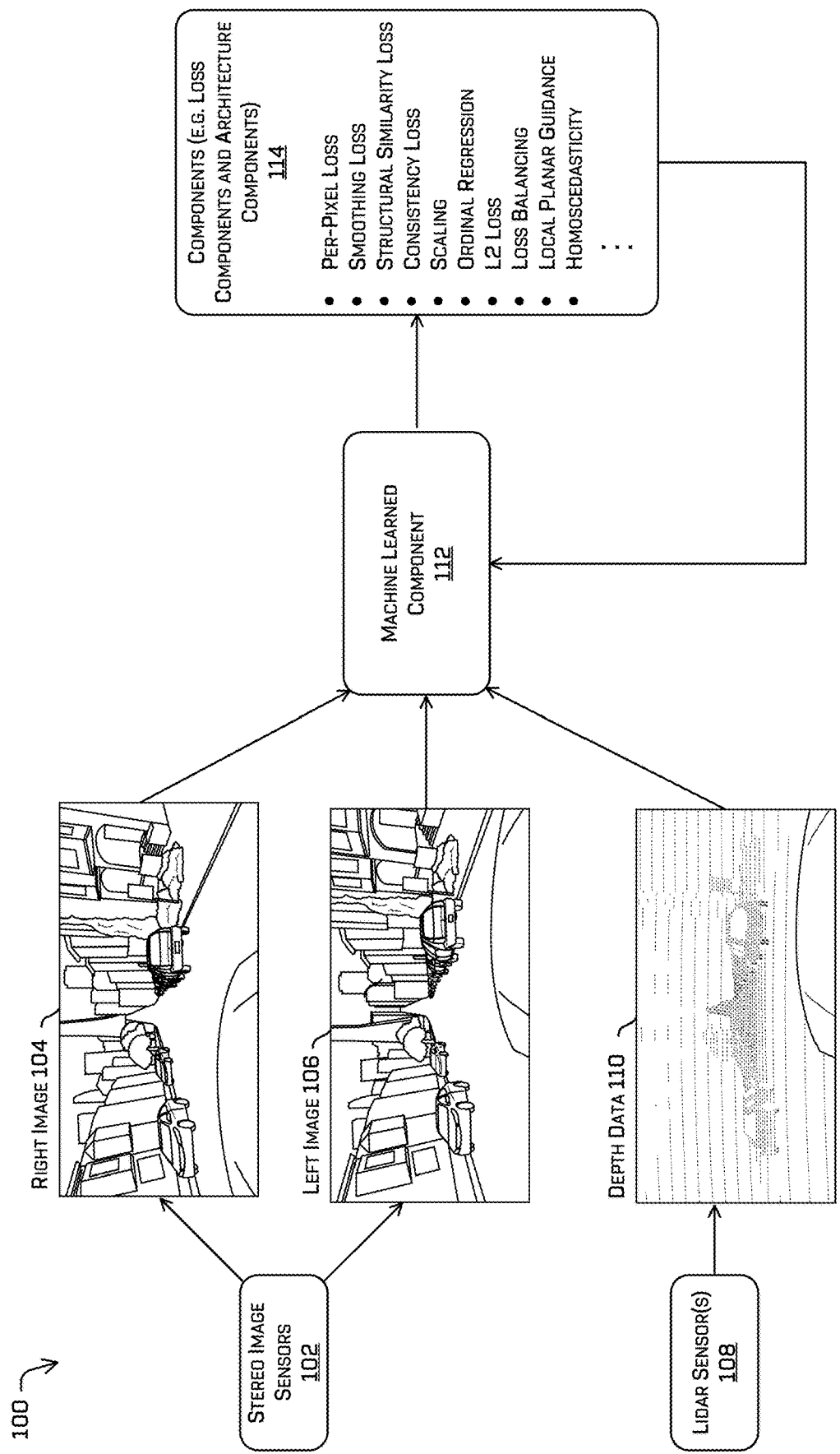
FIG. 1 is a pictorial flow diagram of an example process of a training a machine learned model based on stereo image data, depth data, and various losses.

This disclosure describes systems, methods, and apparatuses for training a machine learned model to determine depth data based on image data. Training can be based on stereo image data and depth data (e.g., lidar data). When fully trained, the machine learned model can receive image data (e.g., a single image) and can output predicted depth information associated with pixels in the image. The machine learned model can be trained using stereo images based on the differences in a scene between a left image and a right image of a stereo image pair. For example, a first image (e.g., a left image) can be input to a machine learned model, which can output predicted depth data. The predicted depth data can be used in conjunction with second image data (e.g., a right image) to reconstruct the first image. Differences between the first image and the reconstructed first image can be used to determine a loss. Example losses include, but are not limited to, pixel loss(es), smoothing loss(es), structural similarity loss(es), and/or consistency loss(es). Further, differences between depth data (e.g., representing a ground truth depth) and the predicted depth data can be determined, and the machine learned model can be trained based on the losses discussed herein. Thus, the techniques can use self-supervised training (e.g., based on stereo images) and supervised training (e.g., based on depth data) to train a machine learned model.

The machine learned model may be trained based at least in part on a variety of losses, including but not limited to: pixel loss(es), smoothing loss(es), structural similarity loss(es), consistency loss(es) (e.g., left/right consistency loss(es), depth/disparity loss(es), etc.), and the like. Details of the various losses are discussed throughout this disclosure.

In some examples, the techniques discussed herein can include determining a pixel loss. For example, operations can include determining a difference between a pixel in the left image data and a corresponding pixel in the reconstructed left image data. In some examples, the pixel loss can represent a difference in intensity values (e.g., R, G, B values) between the corresponding pixels. As can be understood, operations can include determining a difference between a pixel in right image data and a corresponding pixel in reconstructed right image data (e.g., a pixel representative of the same portion of the environment). In some examples, if a pixel loss is above a threshold value this may indicate that the pixel in image data does not correspond to a pixel in the reconstructed image data (e.g., due to an occlusion), in which case, the pixel loss associated with the particular pixel can be disregarded for the purposes of training.

In some examples, the techniques discussed herein can include determining a smoothing loss. For example, operations can include performing averaging for a patch of an image before, after, or in conjunction with determining the losses discussed herein. In some examples, the smoothing loss can be down-weighted based on an edge detected in the image data. In some examples, the smoothing loss can be evaluated with respect to a single image.

In some examples, the techniques discussed herein can include determining a structural similarity loss. For example, operations can include comparing patches or regions of a first image and a reconstructed first image. Operations can be performed on the various patches, such as determining an average RGB value of a patch and comparing the data from a first patch (e.g., from the first image) to data from a second patch (e.g., from the reconstructed first image). In some examples, the structural similarity loss can include comparing location(s) and/or presence(s) of edges or discontinuities in corresponding first and second patches. Thus, a structural similarity loss can determine information about the general layout or structure of the respective images, where differences between patches can represent a loss.

In some examples, the techniques discussed herein can include determining a consistency loss. For example, the techniques discussed herein can be used to determine a reconstructed first image (e.g., a reconstructed left image based on right image data and first predicted depth information) and a reconstructed second image (e.g., a reconstructed right image based on left image data and second predicted depth information). A consistency loss (e.g., a left/right consistency loss) can be determined based on the differences between the reconstructed first image and the reconstructed second image.

In some examples, a consistency loss can enforce consistency between data from different output heads of a machine learned model. For example, a first output head of a machine learned model can output disparity data, predicted depth data, and/or inverse predicted depth data based on the self-supervised techniques discussed herein (e.g., based on image-based supervision). In some examples, a second output head of the machine learned model can output depth data based on fully supervised techniques discussed herein (e.g., based on lidar-based (or depth-data based) supervision). The consistency loss can enforce a consistency between the two or more outputs such that depth information (or disparity information) output by the first output head is consistent with depth information output by the second output head. A difference between the outputs can be used as a loss to minimize the difference in outputs as the machine learning model is trained.

In some examples, the structural similarity loss and/or the consistency loss can be based at least in part on classification information associated with pixels or patches of data. For example, structural similarity and/or consistency can be enforced only between patches or pixels having the same classification, or other segmentation information.

In some cases, a machine learned model can output a variety of predicted depth data. For example, the machine learned model can output depth data, inverse depth data, disparity data, and the like. In some examples, the depth data and/or the inverse depth data can represent a measure between an origin (e.g., a location associated with an image sensor or a depth sensor) and an object in the environment (which, in some examples, may be determined along a ray from an origin passing through the pixel coordinate). In some examples, disparity data can represent a horizontal shift of a pixel (or data element) between a first image (e.g., a left image) and a second image (e.g., a right image). In some examples, the disparity data can be related to the depth data by intrinsic and/or extrinsic information associated with stereo image sensors.

In some examples, the machine learned model can separately determine depth data and disparity data. As noted above, and in some examples, a difference between the depth data and the disparity data can be determined, which can represent a consistency loss (e.g., a depth/disparity consistency loss) to enforce consistency between the various predicted data.

In some instances, an output of the machine-learned model can represent a discrete output or can represent a continuous output value. For example, the machine-learned model can determine discrete depth portions/bins associated with the image data. Such bins may be linear or non-linear in either depth, inverse depth, disparity, or any other representation of depth. In some examples, a machine-learned model can output a continuous depth value as a continuous output (e.g., the machine-learned model can output a depth value of 10.65 meters without performing such binning operations). Therefore, the continuous offset can provide a graduated transition of between depth values regardless of whether the discrete depth bins are used. In at least some examples, a combination of binning and offsets may be used (e.g., the model may output a "coarse" measurement of a bin in addition to a fine-grained offset (as may be measured from the "center" of the bin)). In some instances, the machine-learned algorithm can use a loss function and/or softmax loss that is associated with a depth bin to determine the continuous offset.

In some examples, aspects of the machine learned model can including determining a feature map at a first resolution or level of detail and then upsampling the feature map to determine different information at various levels. In some examples, a feature map may correspond to an intermediate output of portion of a machine learned model, such as an encoder portion or a decoder portion of the machine learned model. In some examples, the techniques can include upsampling one or more feature maps based on local planar guidance, which can include predicting unit vectors associated with a direction and/or magnitude for upsampling. In some examples, local planar guidance may be an example of shaped-based upsampling techniques (e.g., using spheres, planes, or other shapes to upsample), in contrast to bilinear upsampling techniques.

In some examples, any of the losses can represent a L1 loss (mean absolute error), an L2 loss (mean squared error), likelihood loss, log loss, cross entropy loss, hinge loss, Huber loss, and the like.

In some examples, the techniques discussed herein can use loss balancing to combine, aggregate, or otherwise determine a loss for training the machine learned model. For example, the various losses disused herein, such as the pixel loss, smoothing loss, structural similarity loss, left/right consistency loss, depth/disparity consistency loss, and the like can be combined using loss balancing techniques to determine a "final" loss for training (e.g., backpropagating through the machine learned model). In some examples, the losses can be combined or aggregated based at least in part on one or more weights. In some examples, the weights can be learned as an aspect of the training operations. In some examples, such learning can be based on homoscedasticity. In some examples, homoscedasticity may determine one or more weights associated with losses based at least in part on an uncertainty associated with the various losses.

The machine-learning model can be trained using training image data and training lidar data as a ground truth for training the machine-learning model. Accordingly, the techniques discussed herein may include unsupervised training, self-supervised training, semi-supervised training, fully supervised training, or any combination thereof. Additional examples of training machine-learning models can be found, for example, in U.S. patent application Ser. No. 15/803,682 titled "Dense Depth Estimation of Image Data" and filed Nov. 3, 2017, the entirety of which is herein incorporated by reference. In some instances, the training image data can include data at a higher resolution or that represents a higher density of data as compared to the training lidar data. For purposes of illustration only, the training image data can include data from three channels (e.g., red, green, blue) each having millions of pixels, while the training lidar data corresponding to the training image data can include on the order of hundreds of thousands of points, or fewer. Therefore, based on the difference between the training image data and the amount of corresponding training lidar data, it can be understood that certain pixels of image data may not have a corresponding lidar measurement. In some instances, the operations discussed herein can provide depth data (e.g., monodepth data) corresponding to the image data, such that some or all of the individual pixels of the training image data can be associated with depth data.

In some instances, a machine-learning algorithm can be trained using additional channels of data including, for example, three channels that correspond to the RGB data, one channel that corresponds to a binary indication (e.g., a binary channel) that indicates whether lidar (or other depth data) is available for a particular pixel, and/or one channel can correspond to a depth measurement associated with the particular pixel. In some instances, the depth measurement can be considered a ground truth where the machine-learning model being trained can determine depth data to minimize a difference between the ground truth and the generated depth data. As can be understood, any number of channels and/or type(s) of data can be used for training a machine-learning model and as input to a deployed machine-learned algorithm. In some instances, the binary channel can be omitted.

A trained machine learned model can be sent or otherwise implemented to generate depth data from data from a single image sensor. That is, the trained machined learned model may receive image data as input and may output depth data associated with some or all pixels of the image data. In some instances, the depth data can be stored for subsequent processing. For example, some applications or systems of an autonomous vehicle can use the depth data for localization, perception (e.g., detecting, identifying, segmenting, classifying, tracking, etc. objects in the environment), relative depth data generation, etc. As can be understood, these applications are examples, and such examples and uses of depth data or measured depth data is not intended to be limiting. Additional examples of determining and using image-based depth data can be found, for example, in U.S. patent application Ser. No. 16/408,407 titled "Depth from Vision" and filed May 9, 2019, the entirety of which is herein incorporated by reference.

In some instances, image-based segmentation techniques can be used remove dynamic objects to improve training operations. For examples, image based segmentation techniques can be used to identify and remove/discard data associated with dynamic objects represented in image data, whereby the remaining data can represent static objects in an environment. For example, depth data associated with dynamic objects (e.g., vehicles, pedestrians, cyclists, animals, debris, etc.) can be excluded from the image data such that disparity data predicted by the machine learned model can be based on the stereo image sensor configuration rather than on movement of objects in an environment. Lidar-based segmentation techniques can also be used to identify and remove/discard data associated with dynamic objects, for example, for the purpose of training the machine learning model.

As introduced above, a vehicle can use the depth data generated by the machine-learned model to perform operations including perception operations to, for example, detect, identify, segment, classify, and/or track objects, among other operations, of an environment. In some instances, the depth data can be used to generate a three-dimensional bounding box (or, otherwise, a mask) associated with an object.

In some instances, the techniques discussed herein can be implemented in a system including image sensor(s) (e.g., red-green-blue (RGB) cameras, intensity cameras (greyscale), infrared cameras, ultraviolet cameras, and the like), depth cameras (e.g., RGB-D cameras), time-of-flight sensors, lidar sensors, radar sensors, sonar sensors, and the like, to provide redundancy to the system in the event of hardware or software failure. For example, in the event that a depth camera, a lidar sensor, and/or a radar sensor is occluded or malfunctioning, the techniques discussed herein can be used with an image sensor to provide redundancy and/or backup to ensure that dense depth information can be available under many circumstances. Therefore, the techniques discussed herein can provide additional improvements to, for example, machine-vision systems.

The depth data generation techniques described herein can improve a functioning of a computing device by providing additional depth data for performing subsequent operations to control an autonomous vehicle (or other system). For example, depth data associated with image data can allow subsequent processes such as localization, perception (e.g., detecting, identifying, segmenting, classifying, tracking, etc.), route planning, trajectory generation, and the like to be performed more accurately, may require less processing power, and/or may require less memory. For example, in some instances, faster and/or more accurate segmentation can be used in generating a trajectory of an autonomous vehicle, which can improve safety for occupants of an autonomous vehicle. Further, in some examples, the techniques discussed herein can be used to verify a calibration of sensors, can provide error checking or voting to determine if a sensor measurement is inaccurate (e.g., by comparing a depth measurement to another depth sensor), and/or can be used as a fallback in the event other sensors are occluded or disabled. In some examples, training a machine learned model using such self-supervised and supervised techniques (which together may comprise semi-supervised training) provide for a machine learned model that may output more accurate depth estimates than a model trained without these techniques. These and other improvements to the functioning of the computer are discussed herein.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or a robotic platform), and are not limited to autonomous vehicles. In one example, similar techniques may be utilized in driver controlled vehicles in which such a system may provide an indication of whether it is safe to perform various maneuvers. In another example, the techniques can be utilized in a manufacturing assembly line context, in an aerial surveying context, or in a nautical context. Additionally, the techniques described herein can be used with real data (e.g., captured using sensor(s)), simulated data (e.g., generated by a simulator), or any combination of the two.

FIG. 1 is a pictorial flow diagram 100 of an example process of a training a machine learned model based on stereo image data, depth data, and various losses.

Operations can include capturing and/or receiving image data from stereo image sensors 102. For example, stereo image sensors 102 can capture a right image 104 and a left image 106 of an environment. As illustrated in the right image 104 and the left image 106, the image data can represent an environment in which an autonomous vehicle is traversing.

Operations can further include capturing and/or receiving depth data from lidar sensor(s) 108 (also referred to as a lidar sensor 108). For example, the lidar sensor 108 can capture depth data 110 representing at least a portion of the environment represented by the right image 104 and/or the left image 106. In some examples, the lidar sensor 108 can be aligned and/or calibrated in conjunction with the stereo image sensors 102 such that the sensors capture a same portion of the environment. In some examples, depth data may be captured by a time-of-flight sensor, in addition to or instead of depth data captured by a lidar sensor.

Figure 2:
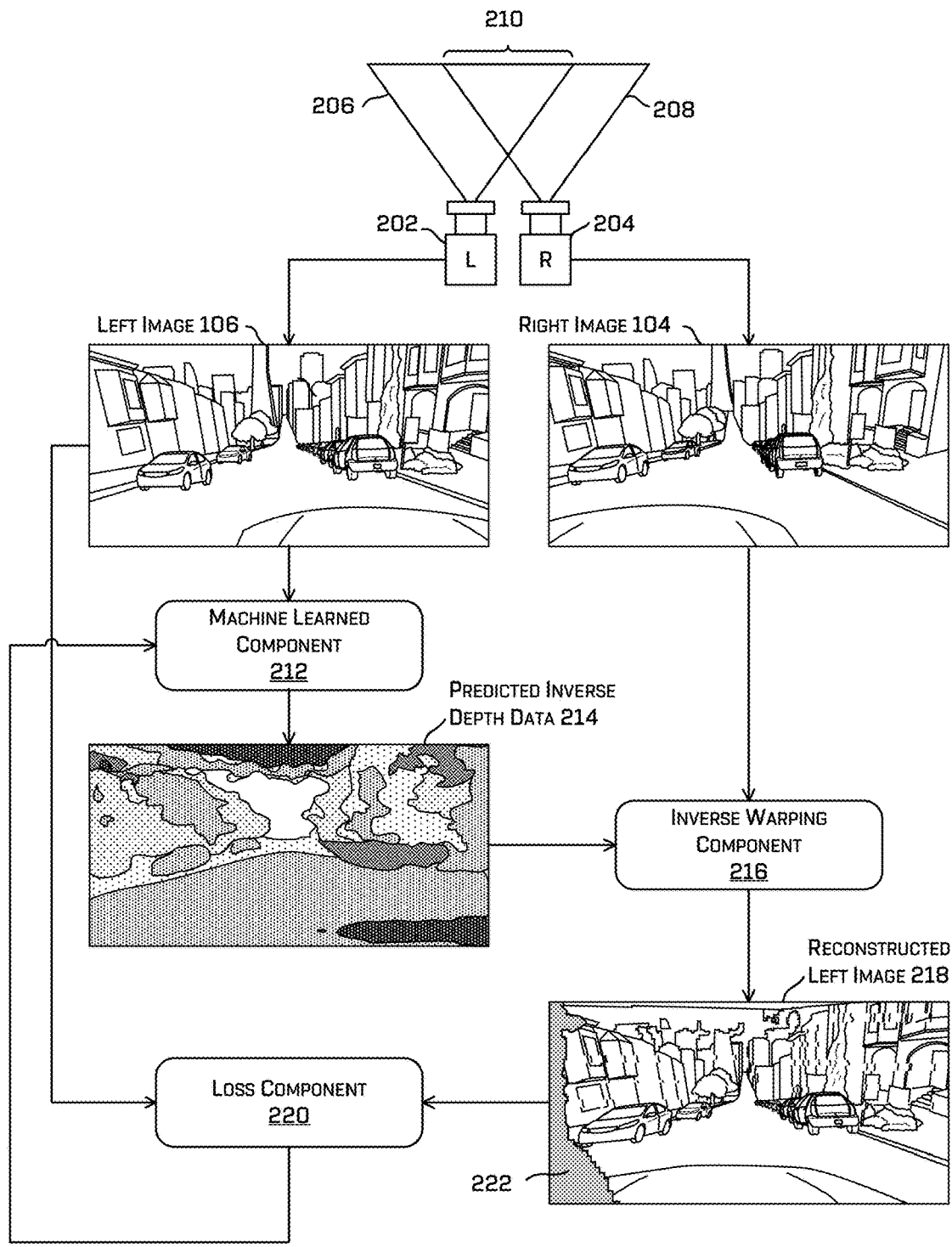
FIG. 2 is a pictorial flow diagram of an example process of training a machine learned model based on determining a loss based on a difference between image data and reconstructed image data.

As noted above, the right image 104 and/or the left image 106 can represent millions of RGB pixels representing an environment. The stereo image sensors 102 can comprise a left image sensor and a right image sensor (e.g., as illustrated in FIG. 2) where the sensors capture at least partially overlapping fields of view. In some examples, the lidar sensor(s) 108 can capture at least a portion of the environment corresponding to at least a portion a field of view associated with the left image sensor or the right image sensor. In some examples, image data may be captured by various image sensors associated with different orientations.

That is, the techniques discussed herein are not limited to stereo image sensors and may include image sensors with multi-view geometry that share some co-visibility.

Image data corresponding to the right image 104 and the left image 106, and the depth data 110 can be input to a machine learned component 112 for training the machine learned component 112. As discussed herein, the machine learned component 112 can be trained to ultimately output depth data based on input image data. In some examples, the machine learned component 112 can be trained based at least in part on various components 114. In some examples, such components 114 may represent various loss components and/or architecture components, as discussed herein.

For example, the components 114 can include, but are not limited to, one or more of a per-pixel loss (also referred to as a pixel loss), a smoothing loss component, a structural similarity loss component, a consistency loss component (e.g., a left/right consistency, a depth/disparity consistency, edge-based consistency, segmentation-based consistency, etc.), a scaling component, an ordinal regression component, an L2 loss component, a loss balancing component, a local planar guidance component, a homoscedasticity component, and the like. Additional details of the aforementioned components are discussed above and throughout the disclosure.

Upon training the machine learned component 112, the machine learned component 112 can be used to determine depth data of an environment based on image data (e.g., image data from a single image sensor). Such depth data can be used in connection with an autonomous vehicle traversing an environment. In some instances, the depth data can be stored for subsequent processing. For example, some applications or systems of an autonomous vehicle can use the depth data for localization, perception (e.g., detecting, identifying, segmenting, classifying, tracking, etc. objects in the environment), relative depth data generation, etc. As can be understood, these applications are examples, and such examples and uses of depth data or measured depth data is not intended to be limiting.

FIG. 2 is a pictorial flow diagram 200 of an example process of training a machine learned model based on determining a loss based on a difference between image data and reconstructed image data.

Operations can include capturing and/or receiving image data captured by stereo image sensors, as discussed herein. For example, a first image sensor 202 (e.g., a left image sensor of a stereo image sensor pair) can capture a left image 106 of an environment. A second image sensor 204 (e.g., a right image sensor of a stereo image pair) can capture a right image 104 of an environment. The left image 106 can represent a field of view 206 associated with the first image sensor 202, while the right image 104 can represent a field of view 208 associated with the second image sensor 204. At least a portion of the fields of view can be overlapping, illustrated as an overlapping portion 210. As can be understood, at least a portion of the fields of view 206 and 208 may not be overlapping.

Next, the left image 106 can be input to a machine learned component 212, which may correspond to the machine learned component 112 of FIG. 1. Although FIG. 2 illustrates the left image 106 being input to the machine learned component 212, operations can include inputting the right image 104 into the machine learned component in series or in parallel with inputting the left image 106, as discussed in connection with FIG. 3, as well as throughout the disclosure.

In some examples, operations can include rectifying the left image 106 and the right image 104 such that corresponding points in the left image 106 and the right image 104 lie within the same row of pixels. In some examples, rectifying the image data can simplify operations for determining a disparity and/or warping operations.

The machine learned component 212 can determine predicted inverse depth data 214 based at least in part on the left image 106. In some examples, the machine learned component 212 can output depth data, disparity data, and the like. In some examples, the predicted inverse depth data 214 can represent an inverse depth value for efficiency of computations.

The operations can include inputting the predicted inverse depth data 214 and the right image 104 into an inverse warping component 216. The inverse warping component 216 can include functionality to warp the right image 104 based on the predicted inverse depth data 214 and based on intrinsic camera parameters (e.g., lens distortion, focal length, etc.) and/or extrinsic camera parameters (e.g., a pose (e.g., an orientation) of individual image sensors and the stereo image sensors, etc.). For example, given the predicted inverse depth data 214, the right image 104, and the camera intrinsics, the inverse warping component 216 can determine a disparity between points and use the disparity to determine a reconstructed left image 218.

The reconstructed left image 218 and the left image 106 can be input to a loss component 220 to determine differences or losses between the left image 106 and the reconstructed left image 218. In some examples, areas where the right image 104 does not overlap with the left image 106 can result in null data for the reconstructed left image 218. Such null data can be represented as a region 222, which may be down-weighted or excluded when determining losses for training.

As discussed herein, the loss component 220 can determine a variety of losses for training the machine learned component 212. For example, the loss component can determine pixel loss(es), smoothing loss(es), structural similarity loss(es), consistency loss(es), and the like.

In some examples, the operations can include generating a reconstructed right image based on left image data and predicted inverse depth data (or predicted disparity data) based on the left image data (and vice versa).

Figure 3:
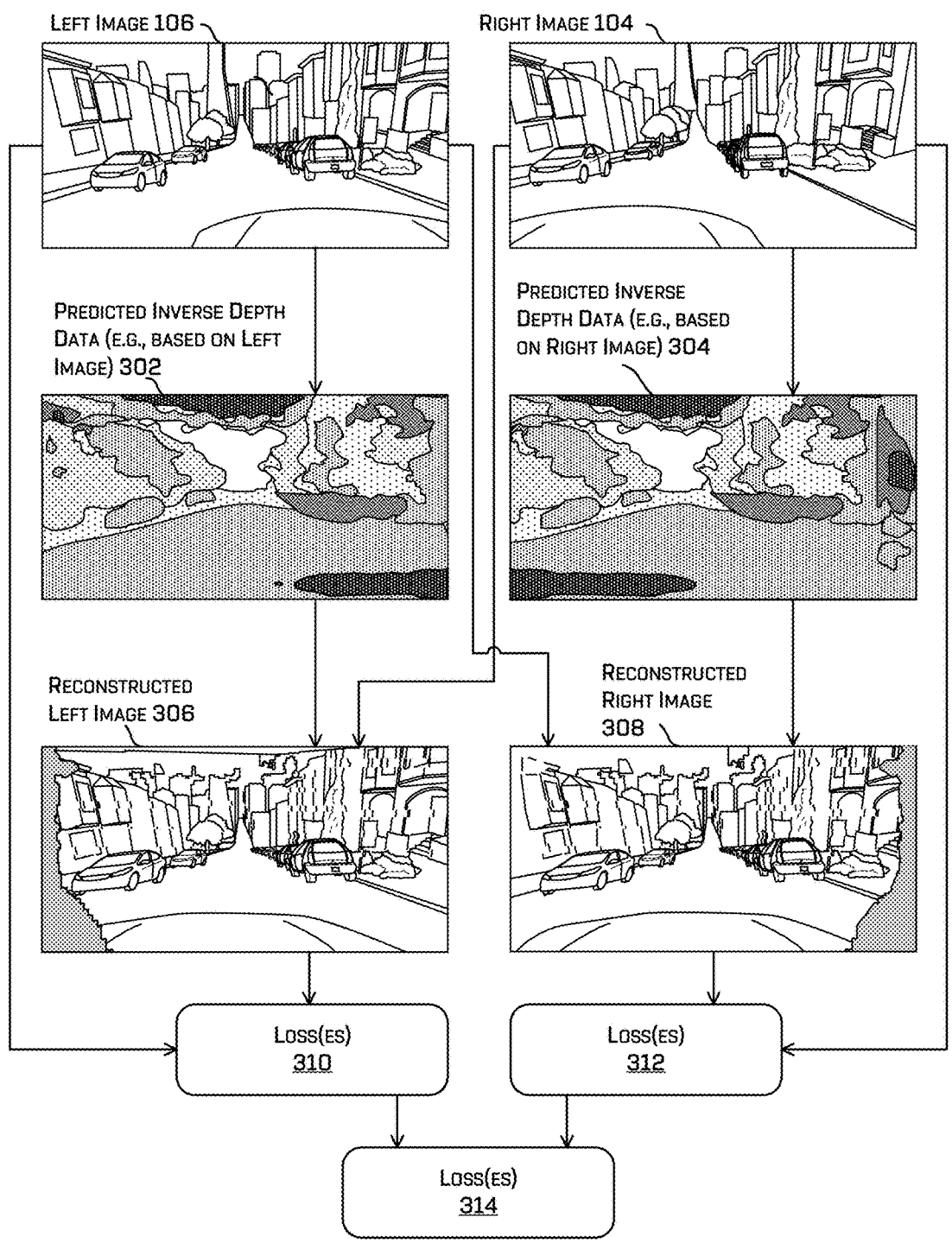
FIG. 3 is a pictorial flow diagram of an example process of training a machine learned model based on a loss associated with stereo image data.

FIG. 3 is a pictorial flow diagram 300 of an example process of training a machine learned model based on a loss associated with stereo image data. Aspects of FIG. 3 can be performed by one or more components discussed in connection with FIGS. 1 and 2, which may be omitted for clarity.

For example, the operations can include capturing or receiving the left image 106 and determining predicted inverse depth data 302 (e.g., based on the left image 106). Further, the operations can include capturing or receiving the right image 104 and determining predicted inverse depth data 304 (e.g., based on the right image 104). Determining predicted depth data can be performed in serial or in parallel, within technical tolerances.

The operations can further include determining a reconstructed left image 306 based on the predicted inverse depth data 302 and the right image 104, as discussed above in FIG. 2. Further, the operations can include determining a reconstructed right image 308 based on the predicted inverse depth data 304 and the left image 106, as discussed herein.

One or more losses (e.g., loss(es) 310) can be determined based at least in part on the reconstructed left image 306 and the left image 106. In some examples, the loss 310 can represent one or more of pixel loss(es), smoothing loss(es), structural similarity loss(es), consistency loss(es) (e.g., a left/right consistency, an edge-based consistency, a segmentation-based consistency, etc.), and the like. In some examples, the consistency loss (e.g., a left/right consistency loss) can represent a sum or otherwise aggregated differences between pixels in image data and reconstructed image data. In some examples, the consistency loss can correspond to differences between the reconstructed images (e.g., the reconstructed left image 306 and the reconstructed right image 308).

Similarly, one or more losses (e.g., loss(es) 312) can be determined based at least in part on the reconstructed right image 308 and the right image 104. In some examples, categories/types of the loss(es) 312 can substantially correspond to the loss(es) 310.

The loss(es) 310 and 312 can be combined, summed, or otherwise aggregated to determine loss(es) 314. The machine learning models discussed herein can be trained based at least in part on the loss(es) 314.

Figure 4:
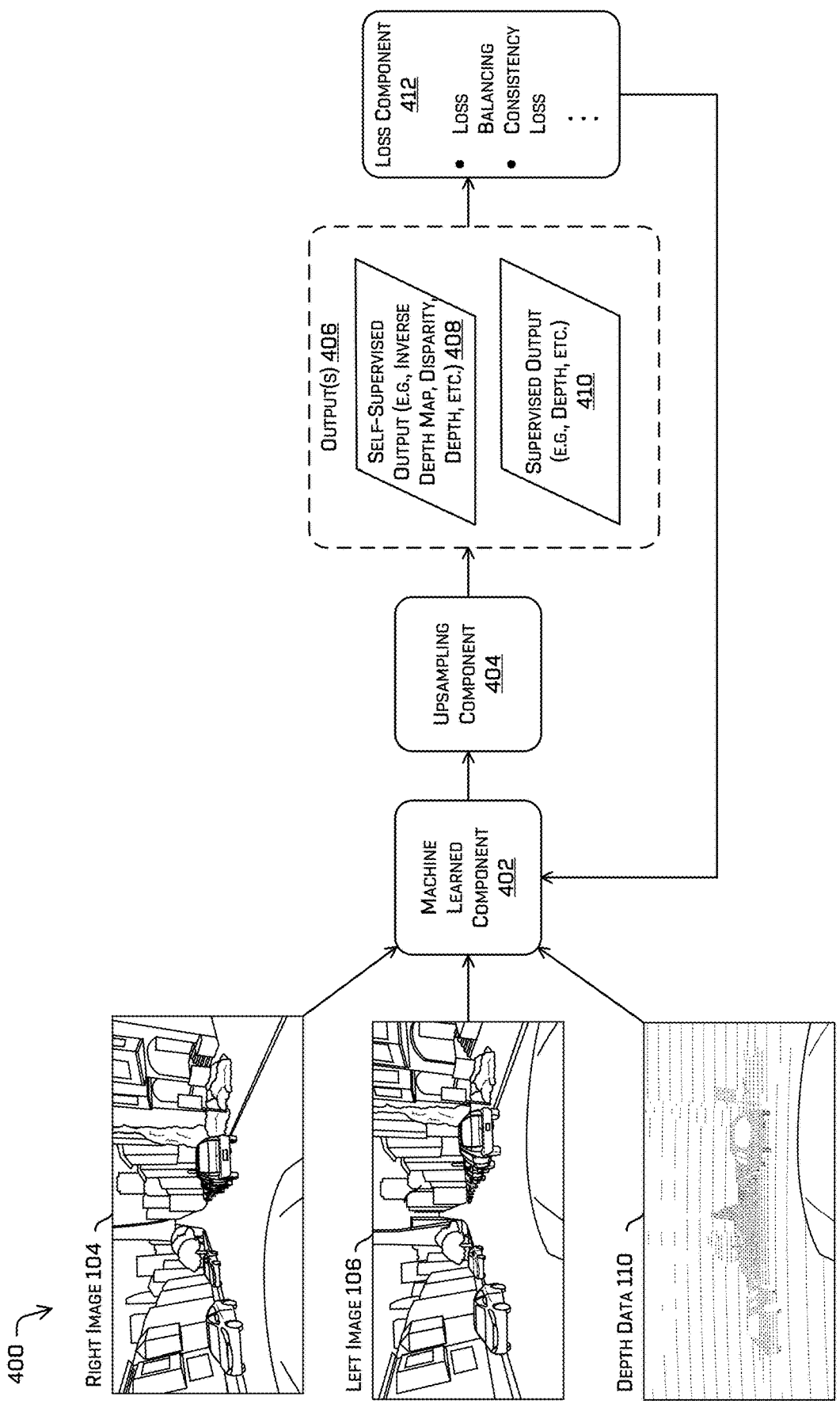
FIG. 4 is a pictorial flow diagram of an example process of training a machine learned model based on a loss associated with a self-supervised output and/or a supervised output.

FIG. 4 is a pictorial flow diagram 400 of an example process of training a machine learned model based on a loss associated with a self-supervised output and a supervised output.

As discussed above, the training operations can include capturing and/or receiving image data (e.g., represented as the right image 104 and the left image 106) captured by stereo image sensors. The training operations can further include capturing and/or receiving the depth data 110 (e.g., captured by one or more lidar sensors and/or time of flight sensors). The right image 104, the left image 106, and the depth data 110 can be input to a machine learned component 402.

In some examples, the machine learned component 402 can include a neural network, a convolutional neural network, a recurrent neural network, and the like. In some examples, the machine learned component 402 can correspond to the machine learned components 112 and 212, as discussed in FIGS. 1 and 2, respectively.

The machine learned component 402 can determine one or more feature maps based at least in part on the image data (e.g., the right image 104 and/or the left image 106) and/or the depth data 110. In some examples, the machine learned component 402 can output one or more feature maps to an upsampling component 404. In some examples, the upsampling component 404 may be a separate component from the machine learned component 402 or may be incorporated into the machine learned component 402. In some examples, the upsampling component 404 may represent or may be part of a decoder portion of a machine learned model.

In some examples, the upsampling component may upsample one or more feature maps to various resolution levels based at least in part on local planar guidance. In some examples, local planar guidance can include functionality to predict unit vector(s) associated with a direction and/or magnitude of individual pixels or features for upsampling.

The machine learned component 402 and/or the upsampling component 404 can determine output(s) 406, which may include a self-supervised output 408 (e.g., an inverse depth map, disparity, depth, etc.) and/or a supervised output 410 (e.g., depth, etc.).

In some examples, the self-supervised output 408 can be based at least in part on losses determined in connection with the reconstructed image data, as discussed herein.

In some examples, the supervised output 410 can be based at least in part on comparing predicted depth data with the depth data 110 as ground truth data.

In some examples, the machine learned component 402 may comprise separate output heads of the neural network to output the self-supervised output 408 and the supervised output 410. The output(s) 406 may be input to a loss component 412 to determine various losses based on the data.

For example, the loss component 412 can determine consistency loss(es) and/or loss balancing. For example, a consistency loss can determine difference between the self-supervised output 408 (e.g., represented as disparity data) and the supervised output 410 (e.g., represented as depth data). Such a consistency loss can be referred to as a depth/disparity consistency loss.

In some examples, the consistency loss can be one-sided (e.g., using the supervised output as ground truth for determining a first loss associated with the self-supervised output, or using the self-supervised output as ground truth for determining a second loss associated with the supervised output) or the consistency loss can be two-sided (e.g., using the supervised output as ground truth for determining the first loss associated with the self-supervised output and using the self-supervised output as ground truth for determining the second loss associated with the supervised output, and determining a third loss based on the first and second losses). In some examples the consistency loss can be an edge-based consistency loss (e.g., consistency based on edges between images and reconstructed images) or a segmentation-based consistency loss (e.g., consistency between classifications of data or instance segmentations between data).

In some examples, the loss associated with the supervised training (e.g., based on lidar data representing a ground truth) can be based at least in part on an ordinal regression. In some examples, the loss based on ordinal regression can be proportional or related to the difference between an error and a ground truth value.

The loss component 412 can further include functionality for loss balancing. For example, the operations can include determining a variety of losses, such as pixel loss(es), smoothing loss(es), structural similarity loss(es), consistency loss(es), and the like. Such losses can be summed or aggregated to determine an aggregated loss to backpropagate through the machine learned component 402 for training. In some examples, the losses can be summed according with weights and/or uncertainties associated with each loss. In some examples, the weights can be learned as part of the training process. In some examples, the weights associated with the losses can be determined based at least in part on homoscedasticity.

Figure 5:
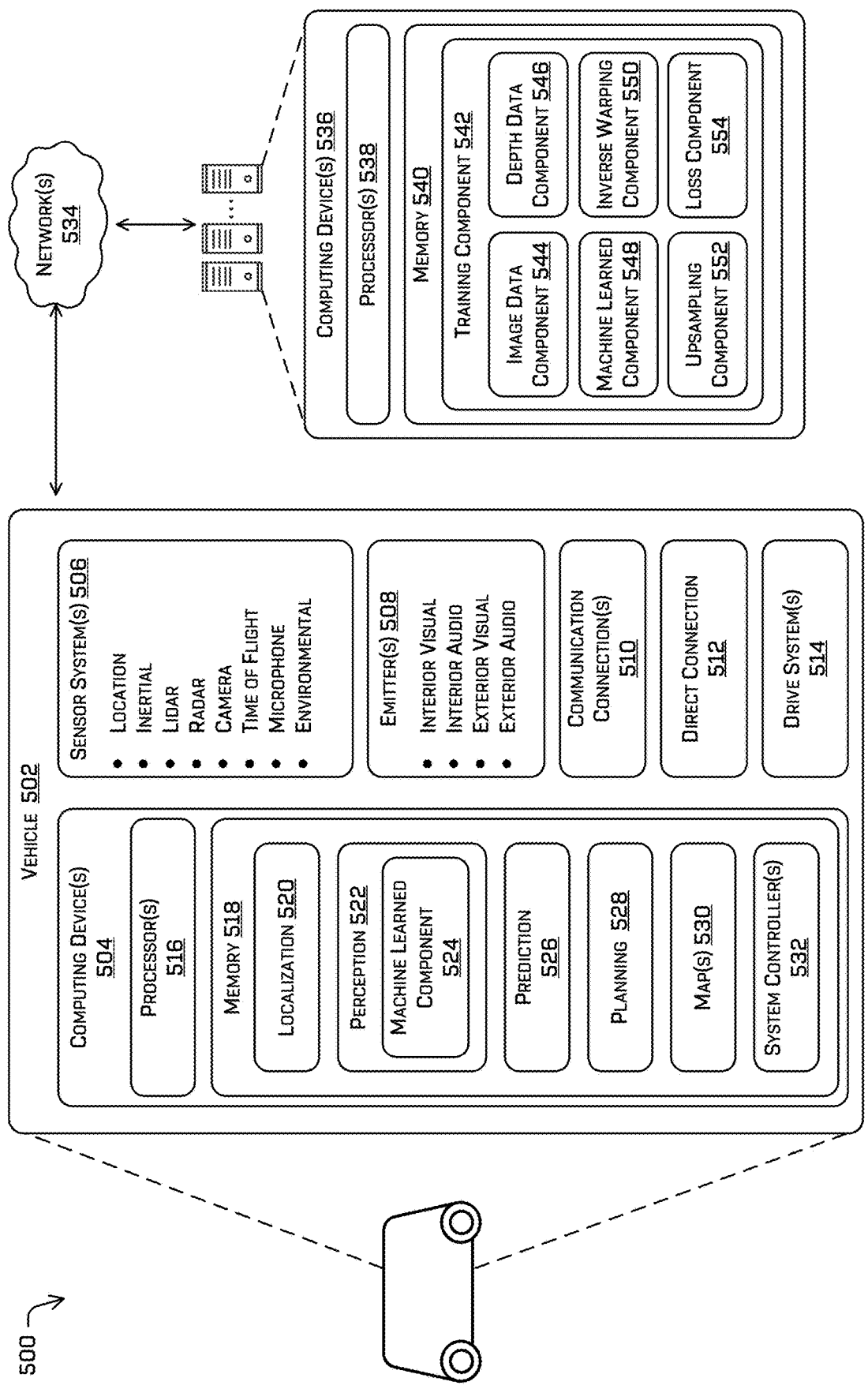
FIG. 5 is a block diagram of an example computer system for implementing the techniques described herein.

FIG. 5 depicts a block diagram of an example system 500 for implementing the techniques discussed herein. In at least one example, the system 500 can include a vehicle 502. In the illustrated example system 500, the vehicle 502 is an autonomous vehicle; however, the vehicle 502 can be any other type of vehicle.

The vehicle 502 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 502 can be configured to control all functions from start to completion of the trip, including all parking functions, it may not include a driver and/or controls for driving the vehicle 502, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The vehicle 502 can include one or more computing device(s) 504, one or more sensor system(s) 506, one or more emitter(s) 508, one or more communication connection(s) 510 (also referred to as communication devices and/or modems), at least one direct connection 512 (e.g., for physically coupling with the vehicle 502 to exchange data and/or to provide power), and one or more drive system(s) 514. The one or more sensor system(s) 506 can be configured to capture sensor data associated with an environment.

The one or more sensor system(s) 506 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The one or more sensor system(s) 506 can include multiple instances of each of these or other types of sensors. For instance, the time-of-flight sensors can include individual time-of-flight sensors located at the corners, front, back, sides, and/or top of the vehicle 502. As another example, the camera sensors can include multiple cameras disposed at various locations about the exterior and/or interior of the vehicle 502. The one or more sensor system(s) 506 can provide input to the computing device 504.

The vehicle 502 can also include one or more emitter(s) 508 for emitting light and/or sound. The one or more emitter(s) 508 in this example include interior audio and visual emitters to communicate with passengers of the vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 508 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 502 can also include one or more communication connection(s) 510 that enable communication between the vehicle 502 and one or more other local or remote computing device(s) (e.g., a remote teleoperation computing device) or remote services. For instance, the one or more communication connection(s) 510 can facilitate communication with other local computing device(s) on the vehicle 502 and/or the one or more drive system(s) 514. Also, the one or more communication connection(s) 510 can allow the vehicle 502 to communicate with other nearby computing device(s) (e.g., other nearby vehicles, traffic signals, etc.).

The one or more communications connection(s) 510 can include physical and/or logical interfaces for connecting the computing device 504 to another computing device or one or more external networks 534 (e.g., the Internet). For example, the one or more communications connection(s) 510 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

In at least one example, the vehicle 502 can include one or more drive system(s) 514. In some examples, the vehicle 502 can have a single drive system 514. In at least one example, if the vehicle 502 has multiple drive systems 514, individual drive systems 514 can be positioned on opposite ends of the vehicle 502 (e.g., the front and the rear, etc.). In at least one example, the drive system(s) 514 can include one or more sensor system(s) 506 to detect conditions of the drive system(s) 514 and/or the surroundings of the vehicle 502. By way of example and not limitation, the sensor system(s) 506 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 514. In some cases, the sensor system(s) 506 on the drive system(s) 514 can overlap or supplement corresponding systems of the vehicle 502 (e.g., sensor system(s) 506).

The drive system(s) 514 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 can include a drive system controller which can receive and preprocess data from the sensor system(s) 506 and to control operation of the various vehicle systems. In some examples, the drive system controller can include one or more processor(s) and memory communicatively coupled with the one or more processor(s). The memory can store one or more components to perform various functionalities of the drive system(s) 514. Furthermore, the drive system(s) 514 also include one or more communication connection(s) that enable communication by the respective drive system with one or more other local or remote computing device(s).

The computing device 504 can include one or more processor(s) 516 and memory 518 communicatively coupled with the one or more processor(s) 516. In the illustrated example, the memory 518 of the computing device 504 stores a localization component 520, a perception component 522 comprising a machine learned component 524, a prediction component 526, a planning component 528, a maps component 530, and one or more system controller(s) 532. Though depicted as residing in the memory 518 for illustrative purposes, it is contemplated that the localization component 520, the perception component 522, the machine learned component 524, the prediction component 526, the planning component 528, the maps component 530, and the one or more system controller(s) 532 can additionally, or alternatively, be accessible to the computing device 504 (e.g., stored in a different component of vehicle 502) and/or be accessible to the vehicle 502 (e.g., stored remotely).

In memory 518 of the computing device 504, the localization component 520 can include functionality to receive data from the sensor system(s) 506 to determine a position of the vehicle 502. For example, the localization component 520 can include and/or request/receive a three-dimensional map of an environment and can continuously determine a location of the autonomous vehicle within the map. In some instances, the localization component 520 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 520 can provide data to various components of the vehicle 502 to determine an initial position of an autonomous vehicle for generating a trajectory, as discussed herein.

As discussed above, the localization component 520 can use depth data generated by the machine learned model component 524 to perform the operations described above to determine the position of the vehicle 502. The depth data can provide a local map for comparing against the three-dimensional map (e.g., mesh). In some instances, the localization component 520 can provide functionality to determine an error associated with the local map, the three-dimensional map, and/or the one or more sensor system(s) 506. For example, the localization component 520 can determine a position error (e.g., drift error) associated with the vehicle 502. Over time in operation, errors may accumulate, resulting in errors in positioning and/or trajectory data. In some instances, the localization component 520 can determine the error based on, for example, the position error meeting or exceeding a threshold value. In some instances, the localization component 520 can, based on the position error, determine a calibration adjustment associated with the one or more sensor system(s) 506.

For purposes of illustration only, the localization component 520 can determine a location of the vehicle based on GPS data from the one or more sensor system(s) 506. However, a comparison of the local map can indicate that the vehicle is in a different location than the location indicated by the GPS data. Therefore, the localization component 520 can indicate that an error exists with a GPS sensor and/or the local map.

In some instances, the localization component 520 can determine an update associated with the three-dimensional map. For purposes of illustration only, the one or more sensor system(s) 506 can provide location data to the localization component 520. Additionally, the localization component 520 can determine a location based on a comparison of the local map and the three-dimensional map. However, the comparison can indicate that one or more points of the local map do not correspond with the three-dimensional map. This can indicate that the three-dimensional map is out of date. The localization component 520 can determine a difference between the local map and the three-dimensional map as a map updated and store the map update or provide the map update to, for example, a map data server via network 534.

The perception component 522 can include functionality to perform object detection, segmentation, and/or classification. In some examples, the perception component 522 can provide processed sensor data that indicates a presence of an entity that is proximate to the vehicle 502 and/or a classification of the entity as an entity type (e.g., car, pedestrian, cyclist, building, tree, road surface, curb, sidewalk, unknown, etc.). In additional and/or alternative examples, the perception component 522 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

As described above, the perception component 522 can use perception algorithms to determine a perception-based bounding box associated with an object in the environment based on sensor data. For example, the perception component 522 can receive image data and classify the image data to determine that an object is represented in the image data. Then, using detection algorithms, the perception component 522 can generate a two-dimensional bounding box and/or a perception-based three-dimensional bounding box associated with the object. The perception component 522 can further generate a three-dimensional bounding box associated with the object. As discussed above, the three-dimensional bounding box can provide additional information such as a location, orientation, pose, and/or size (e.g., length, width, height, etc.) associated with the object.

The perception component 522 can include functionality to store perception data generated by the perception component 522. In some instances, the perception component 522 can determine a track corresponding to an object that has been classified as an object type. For purposes of illustration only, the perception component 522, using sensor system(s) 506 can capture one or more images of an environment. The sensor system(s) 506 can capture images of an environment that includes an object, such as a pedestrian. The pedestrian can be at a first position at a time T and at a second position at time T+t (e.g., movement during a span of time t after time T). In other words, the pedestrian can move during this time span from the first position to the second position. Such movement can, for example, be logged as stored perception data associated with the object.

The stored perception data can, in some examples, include fused perception data captured by the vehicle. Fused perception data can include a fusion or other combination of sensor data from sensor system(s) 506, such as image sensors, lidar sensors, radar sensors, time-of-flight sensors, sonar sensors, global positioning system sensors, internal sensors, and/or any combination of these. The stored perception data can additionally or alternatively include classification data including semantic classifications of objects (e.g., pedestrians, vehicles, buildings, road surfaces, etc.) represented in the sensor data. The stored perception data can additionally or alternatively include track data (positions, orientations, sensor features, etc.) corresponding to motion of objects classified as dynamic objects through the environment. The track data can include multiple tracks of multiple different objects over time. This track data can be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

The perception component 522 can include the machine learned component 524, which can be trained according to the techniques discussed herein to determine depth data based on image data. In some examples, the machine learned component 524 can include functionality to receive image data (e.g., a single image frame) and can output depth data associated with each pixel in the image data. In some cases, the machine learned component 524 can function as a back up component in the event one or more other sensors are components are not functioning, and in some examples, the machine learned component 524 can function as a primary source of depth data for the localization component 520, the perception component 522, the prediction component 526, and/or the planning component 528, as discussed herein.

The prediction component 526 can generate one or more probability maps representing prediction probabilities of possible locations of one or more objects in an environment. For example, the prediction component 526 can generate one or more probability maps for vehicles, pedestrians, animals, and the like within a threshold distance from the vehicle 502. In some instances, the prediction component 526 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

The planning component 528 can determine a path for the vehicle 502 to follow to traverse through an environment. For example, the planning component 528 can determine various routes and paths and various levels of detail. In some instances, the planning component 528 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 528 can generate an instruction for guiding the autonomous vehicle along at least a portion of the route from the first location to the second location. In at least one example, the planning component 528 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

In other examples, the planning component 528 can alternatively, or additionally, use data from the perception component 522 and/or the prediction component 526 to determine a path for the vehicle 502 to follow to traverse through an environment. For example, the planning component 528 can receive data from the perception component 522 and/or the prediction component 526 regarding objects associated with an environment. Using this data, the planning component 528 can determine a route to travel from a first location (e.g., a current location) to a second location (e.g., a target location) to avoid objects in an environment.

In at least some examples, such a planning component 528 may determine there is no such collision free path and, in turn, provide a path which brings vehicle 502 to a safe stop avoiding all collisions and/or otherwise mitigating damage.

The memory 518 can further include one or more maps 530 that can be used by the vehicle 502 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 530 can include at least one map (e.g., images and/or a mesh). In some examples, the vehicle 502 can be controlled based at least in part on the map(s) 530. That is, the map(s) 530 can be used in connection with the localization component 520, the perception component 522, the machine learned component 524, the prediction component 226, and/or the planning component 528 to determine a location of the vehicle 502, identify objects in an environment, generate prediction probabilit(ies) associated with objects and/or the vehicle 502, and/or generate routes and/or trajectories to navigate within an environment.

In some examples, the one or more maps 530 can be stored on a remote computing device(s) (such as the computing device(s) 536) accessible via network(s) 534. In some examples, multiple maps 530 can be stored based on, for example, a characteristic (e.g., type of entity, time of day, day of week, season of the year, etc.). Storing multiple maps 530 can have similar memory requirements but can increase the speed at which data in a map can be accessed.

In at least one example, the computing device 504 can include one or more system controller(s) 532, which can be configured to control steering, propulsion, braking, safety, emitters, communication, and other systems of the vehicle 502. These system controller(s) 532 can communicate with and/or control corresponding systems of the drive system(s) 514 and/or other components of the vehicle 502, which may be configured to operate in accordance with a path provided from the planning component 528.

The vehicle 502 can connect to computing device(s) 536 via network 534 and can include one or more processor(s) 538 and memory 540 communicatively coupled with the one or more processor(s) 538. In at least one instance, the one or more processor(s) 538 can be similar to the processor(s) 516 and the memory 540 can be similar to the memory 518. In the illustrated example, the memory 540 of the computing device(s) 536 stores a training component 542 comprising an image data component 544, a depth data component 546, a machine learned component 548, an inverse warping component 550, an upsampling component 552, and a loss component 554. In at least one instance, the machine learned component 548, after training, can be similar to the machine learned component 524. Though depicted as residing in the memory 540 for illustrative purposes, it is contemplated that the training component 542, the image data component 544, the depth data component 546, the machine learned component 548, the inverse warping component 550, the upsampling component 552, and the loss component 554 can additionally, or alternatively, be accessible to the computing device(s) 536 (e.g., stored in a different component of computing device(s) 536 and/or be accessible to the computing device(s) 536 (e.g., stored remotely).

As discussed herein, the training component 542 can train the machine learned component 548 to generate depth data based on image data. The training component 542 can determining training data as inputs to the machine learned component 548. For example, the training data can include sensor data such as training image data captured by a vehicle. In some instances, the image data can be modified image data and/or synthetic image data. Additionally, the training data can include sensor data such as lidar data, time of flight data, and/or radar data as ground truth data.

In some examples, the image data component 544 can include functionality to receive image data captured by stereo image sensors. In some examples, the image data component 544 can preprocess the image data for training, such as by removing distortion and/or rectifying the images with respect to each other. Examples of distortion may include lens distortion, color correction, and the like. Examples of rectifying image data may include aligning the image data such that a pixel in first image data is in the same row as a corresponding pixel in second image data.

In some examples, the depth data component 546 can include functionality to receive depth data captured by one or more lidar sensors, time of flight sensors, radar sensors, and the like. In some examples, the depth data component 546 can align or register the depth data with respect to the image data such that a corresponding point of depth data is associated with a particular pixel in left image data and/or right image data of stereo image data.

The machine learned component 548 can use the training data provided by the training component 542 (e.g., provided by the image data component 544 and/or the depth data component 546) to train a machine learning model to determine depth data associated with the training image data. Once the machine learned component 548 is trained, the machine learned component 548 can be deployed in the vehicle 502 as the (trained) machine learned component 524.

In some examples, the inverse warping component 550 can include functionality to generate or otherwise determine a reconstructed first image based on estimated depth data (e.g., output by a machine learned component) and based on second image data. For example, the inverse warping component 550 can shift pixels from the second image along a horizontal scan line based at least in part on the predicted depth data to generate the reconstructed first image.

In some examples, the upsampling component 552 can include functionality to upsample one or more feature maps output by a machine learned component. In some examples, the upsampling component 552 can be based on local planar guidance (LPG). In some examples, the upsampling component 552 can be included in a decoder portion of a machine learned model or can be a separate component.

In some examples, the loss component 554 can include functionality to determine self-supervised and/or supervised losses, as discussed herein. Losses may include but a not limited to: pixel loss(es), smoothing loss(es), structural similarity loss(es), consistency loss(es) (e.g., a left/right consistency loss, a depth/disparity consistency loss, an edge-based consistency loss, a segmentation-based consistency loss, etc.), and the like. In some examples, any of the losses can represent a L1 loss (mean absolute error), an L2 loss (mean squared error), likelihood loss, log loss, cross entropy loss, hinge loss, Huber loss, and the like. Details of the various losses are discussed throughout this disclosure.

The processor(s) 516 of the computing device 504 and the processor(s) 538 of the computing device(s) 536 can be any suitable processor capable of executing instructions to process data and perform operations as described herein. By way of example and not limitation, the processor(s) 516 and 538 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 518 computing device 504 and the memory 540 of the computing device(s) 536 are examples of non-transitory computer-readable media. The memory 518 and 540 can store an operating system and one or more software applications, instructions, programs, and/or data to implement the methods described herein and the functions attributed to the various systems. In various implementations, the memory 518 and 540 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine-learning algorithms. For example, in some instances, the components in the memory 518 and 540 can be implemented as a neural network.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning or machine-learned algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

Accordingly, the techniques discussed herein provide a robust implementation of determining depth data of an environment based on image data to allow the safe operation of an autonomous vehicle.

Figure 6:
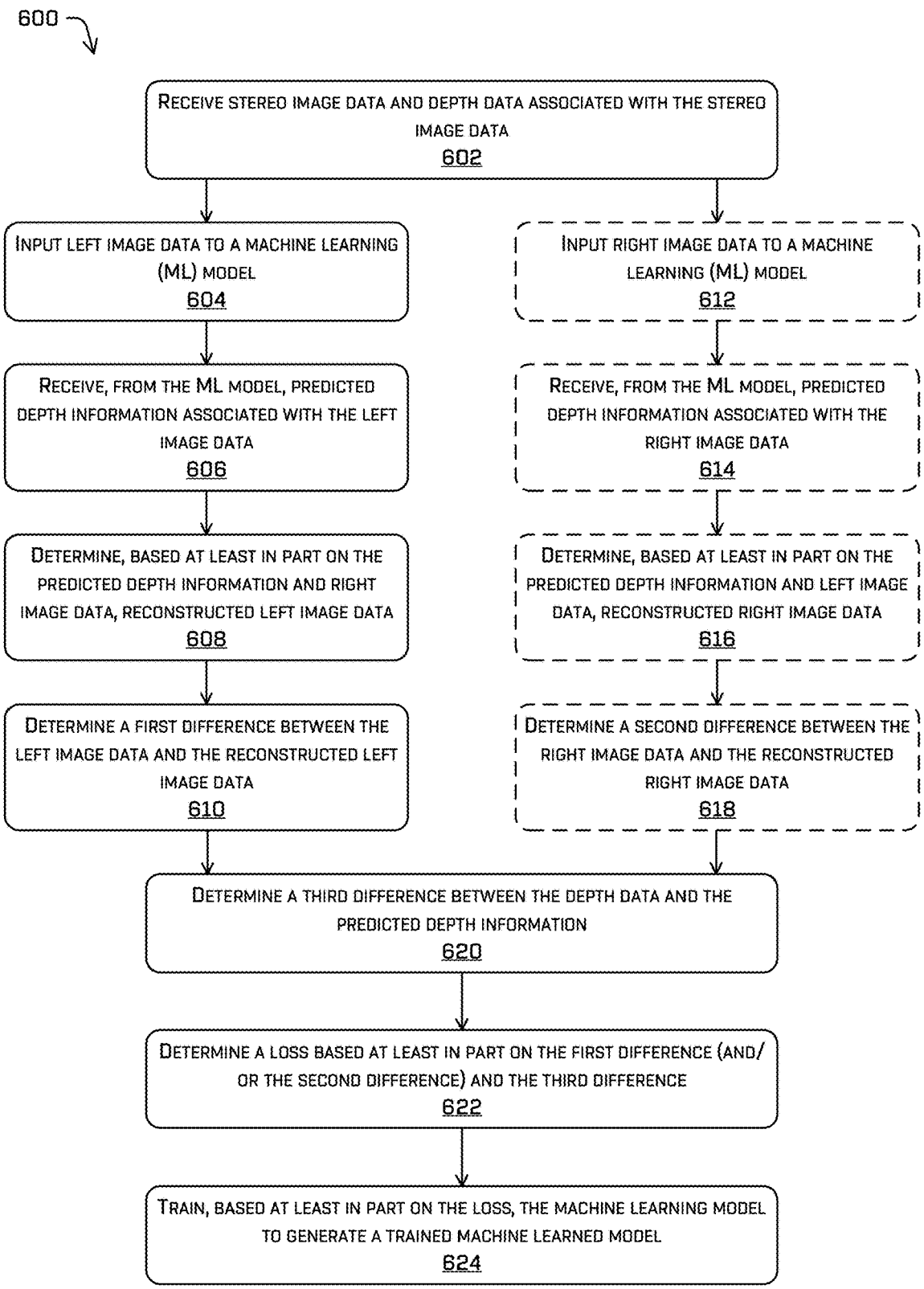
FIG. 6 is an example process for training a machine-learning model to generate image-based depth data.
Figure 7:
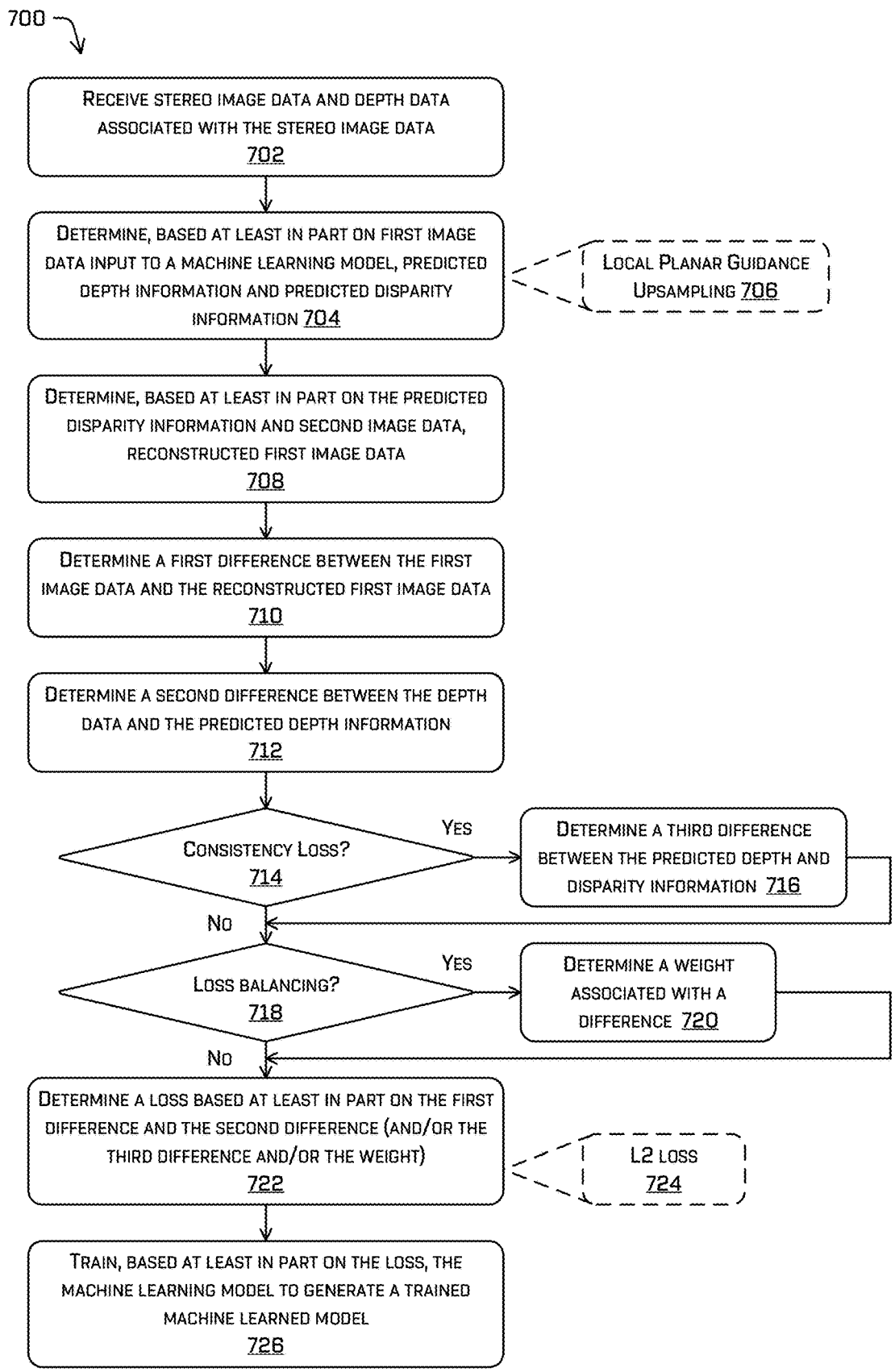
FIG. 7 is another example process for training a machine-learning model to generate image-based depth data.

FIGS. 6 and 7 illustrates example processes in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 6 is an example process 600 for training a machine-learning model to generate image-based depth data. For example, some or all of the process 600 can be performed by one or more components in FIG. 5, as described herein. For example, some or all of the process 600 can be performed by the vehicle computing device(s) 504.

At operation 602, the process can include receiving stereo image data and depth data associated with the stereo image data. In some examples, the operation 602 can include receiving stereo image data and depth data captured by one or more autonomous vehicles as a vehicle traverses an environment. As noted above, in some examples, at least a portion of the environment is represented in both images of the stereo pair. Further, in some examples, the depth data can be associated with at least a portion of the stereo image data to provide a ground truth depth value. As noted above, in some examples, image data may be captured by any multi-view system including co-visibility, and is not limited to stereo image sensors. In some examples, the depth data can be captured by one or more lidar sensors and/or one or more time-of-flight sensors.

At operation 604, the process can include inputting the left image data to a machine learning (ML) model. In some examples, the machine learning model can be configured to output predicted depth information associated with the image data. In some examples, weights associated with the ML model can be initialized with random values at a first time and can be adjusted via backpropagation of a loss at one or more second time(s) after the first time, as discussed herein.

At operation 606, the process can include receiving, from the ML model, predicted depth information associated with the left image data. As noted above, the predicted depth information may comprise, but is not limited to, depth value(s) (e.g., in meters), inverse depth value(s) (e.g., 1/meters), or disparity data (e.g., measuring a horizontal displacement of a pixel from one image to another, where the pixel represents the same object or point in both images). In some examples, the ML model can output predicted depth information for some or all pixels of the image data.

At operation 608, the process can include determining, based at least in part on the predicted depth information (from operation 606) and right image data, reconstructed left image data. In some examples, the operation 608 can include warping the right image based on the predicted depth information to determine the reconstructed left image data. In some examples, the warping can be performed algorithmically or by a machine learned model.

At operation 610, the process can include determining a first difference between the left image data and the reconstructed left image data. In some examples, the operation 610 can include determining one or more losses, including but not limited to a pixel loss, a smoothing loss (e.g., which may be based on a single image), a structural similarity loss, and/or a consistency loss (subject to additional data, discussed herein).

As can be understood, the operations 604, 606, 608, and 610 are discussed in context of the left image data as input. The process 600 can include similar operations for the right image data.

At operation 612, the process can include the process can include inputting the right image data to a machine learning (ML) model. The operation 612 may be similar to the operation 604 discussed above, and may be optional, depending on an implementation.

At operation 614, the process can include the process can include receiving, from the ML model, predicted depth information associated with the right image data. The operation 614 may be similar to the operation 606 discussed above, and may be optional, depending on an implementation.

At operation 616, the process can include determining, based at least in part on the predicted depth information (from operation 614) and left image data, reconstructed right image data. The operation 616 may be similar to the operation 608 discussed above, and may be optional, depending on an implementation.

At operation 618, the process can include determining a second difference between the right image data and the reconstructed right image data. The operation 618 may be similar to the operation 610 discussed above, and may be optional, depending on an implementation.

At operation 620, the process can include determining a third difference between the depth data (e.g., lidar data and/or time-of-flight data received in the operation 602) and the predicted depth information. In some examples, the predicted depth information may be associated with the left image data (e.g., from operation 606) or the predicted depth information may be associated with the right image data (e.g., from the operation 614).

At operation 622, the process can include determining a loss based at least in part on the first difference (and/or the second difference) and the third difference. In some examples, at least one of the first difference, the second difference, or the third difference comprises an L2 loss. In some examples, the operation 622 can comprise summing, aggregating, or otherwise determining the loss based on the difference determined, based on an implementation.

At operation 624, the process can include training, based at least in part on the loss, the machine learning model to generate a trained machine learned model. For example, the loss can be backpropagated through the machine learning model to adjust one or more weights of various activation functions to minimize the overall loss.

In some examples, the process 600 can further include sending the machine learned model to an autonomous vehicle (or other device or component) to determine depth data based on image data, as discussed herein. Further, operations can include determining a trajectory based at least in part on the image-based depth data and/or controlling a vehicle to follow the trajectory.

FIG. 7 is another example process 700 for training a machine-learning model to generate image-based depth data. For example, some or all of the process 700 can be performed by one or more components in FIG. 5, as described herein. For example, some or all of the process 700 can be performed by the vehicle computing device(s) 504.

At operation 702, the process can include receiving stereo image data and depth data (e.g., lidar data and/or time-of-flight data) associated with the stereo image data. In some examples, the operation 702 can substantially correspond to the operation 602.

At operation 704, the process can include determining, based at least in part on first image data input to a machine learning model, predicted depth information and predicted disparity information. In some examples, the operation 704 can substantially correspond to and/or can include aspects of the operations 604, 606, 612, and/or 614. In some examples, the operation 704 can be based at least in part on local planar guidance upsampling 706. For example, the machine learning model can comprise a decoder portion that upsamples one or more feature maps output by an encoder portion of the machine learning model. In some examples, the decoder can use local planar guidance to upsample the feature maps, such that the predicted depth information can be based at least in part on local planar guidance upsampling.

At operation 708, the process can include determining, based at least in part on the predicted disparity information and second image data, reconstructed first image data. In some examples, the operation 708 can substantially correspond to and/or can include aspects of the operations 608 and/or 616.

At operation 710, the process can include determining a first difference between the first image data and the reconstructed first image data. In some examples, the operation 710 can substantially correspond to and/or can include aspects of the operations 610 and/or 618.

At operation 712, the process can include determining a second difference between the depth data and the predicted depth information. In some examples, the operation 712 can substantially correspond to and/or can include aspects of the operation 620.

At operation 714, the process can include determining whether to determine a consistency loss. If yes, the process continues to the operation 716. If no, the process continues to operation 718.

At operation 716, the process can include determining a third difference between the predicted depth information and the predicted disparity information. In some examples, the third difference can represent a depth/disparity consistency loss, as discussed herein. For example, the machine learning model may comprise a first output head that outputs predicted depth information (and/or predicted inverse depth information or disparity information) based on self-supervised training (image-based training) and a second output head that outputs predicted depth information based on supervised training (lidar based training).

At operation 718, the process can include determining whether to balance losses for training the machine learning model. If yes, the process continues to the operation 720. If no, the process continues to operation 722.

At operation 720, the process can include determining a weight associated with a difference. For example, the operation 720 can include determining (e.g., learning) a weight (e.g., a scalar value) to weight the various difference (e.g., the first difference, the second difference, and/or the third difference). In some examples, the operation 720 can be based at least in part on homoscedasticity and/or uncertainties associated with the various losses.

At operation 722, the process can include determining a loss based at least in part on the first difference and the second difference (and/or the third difference and/or the weight). In one example, at least one of the first difference, the second difference, and/or the third difference comprises an L2 loss, represented as element 724.

At operation 726, the process can include training, based at least in part on the loss, the machine learning model to generate a trained machine learned model. In some examples, the operation 726 can substantially correspond to and/or can include aspects of the operation 624.

EXAMPLE CLAUSES

A: A system comprising: one or more processors; and one or more non-transitory computer-readable media storing computer-executable instructions that, when executed, cause the one or more processors to perform operations comprising: training a machine learning model to determine depth information, the training comprising: receiving image data captured by stereo image sensors, the image data comprising left image data captured by a left image sensor and right image data captured by a right image sensor; receiving lidar data captured by a lidar sensor, the lidar data associated with a portion of the image data; inputting the left image data into the machine learning model; receiving, from the machine learning model, predicted depth information associated with the left image data; determining, based at least in part on the predicted depth information and the right image data, reconstructed left image data; determining a first difference between the left image data and the reconstructed left image data; determining a second difference between at least a portion of the predicted depth information and the lidar data; determining a loss based at least in part on the first difference and the second difference; and training, based at least in part on the loss, the machine learning model to generate a machine learned model.

B: The system of paragraph A, the operations further comprising: sending the machine learned model to an autonomous vehicle for controlling the autonomous vehicle.

C: The system of paragraph A or B, wherein the predicted depth information comprises at least one of: depth data; inverse depth data; or disparity data.

D: The system of any of paragraphs A-C, wherein the first difference comprises at least one of: a pixel loss representing a difference in a first intensity value associated with a first pixel of the left image data and a second intensity value associated with a second pixel in the reconstructed left image data; or a structural similarity loss associated with at least one of an edge or a discontinuity associated with the left image data and the reconstructed left image data.

E: The system of any of paragraphs A-D, wherein the predicted depth information is associated with discrete depth values.

F: A method comprising: receiving first image data captured by a first image sensor comprising a first field of view; receiving second image data captured by a second image sensor comprising a second field of view, wherein at least a portion of the first field of view is associated with at least a portion of the second field of view; receiving depth data captured by a depth sensor, the depth data associated with a portion of at least one of the first image data or the second image data; inputting the first image data into a machine learning model; receiving, from the machine learning model, predicted depth information associated with the first image data; determining, based at least in part on the predicted depth information and the second image data, reconstructed first image data; determining a first difference between the first image data and the reconstructed first image data; determining a second difference between the predicted depth information and the depth data; determining a loss based at least in part on the first difference and the second difference; and adjusting, based at least in part on the loss, a parameter associated with the machine learning model to generate a trained machine learned model.

G: The method of paragraph F, further comprising: sending the trained machine learned model to an autonomous vehicle for controlling the autonomous vehicle.

H: The method of paragraph F or G, wherein the predicted depth information comprises at least one of: depth data; inverse depth data; or disparity data.

I: The method of any of paragraphs F-H, wherein the first difference comprises a pixel loss representing a difference in a first intensity value associated with a first pixel of the first image data and a second intensity value associated with a second pixel in the reconstructed first image data.

J: The method of any of paragraphs F-I, further comprising determining a third difference comprising a smoothing loss based at least in part on the reconstructed first image data, wherein a weighting associated with the smoothing loss is based at least in part on an edge represented in at least one of the first image data or the reconstructed first image data.

K: The method of any of paragraphs F-J, wherein the first difference comprises a structural similarity loss based at least in part on at least one of a mean value or a covariance associated with a portion of the first image data.

L: The method of any of paragraphs F-K, wherein the predicted depth information is based at least in part on shape-based upsampling.

M: The method of any of paragraphs F-L, wherein determining the reconstructed first image data comprises warping the second image data based at least in part on the predicted depth information.

N: The method of any of paragraphs F-M, wherein the predicted depth information is first predicted depth information, the method further comprising: inputting the second image data into the machine learning model; receiving, from the machine learning model, second predicted depth information associated with the second image data; determining, based at least in part on the second predicted depth information and the first image data, reconstructed second image data; determining a third difference between the second image data and the reconstructed second image data; and determining the loss further based at least in part on the third difference.

O: One or more non-transitory computer-readable media storing instructions executable by one or more processors, wherein the instructions, when executed, cause the one or more processors to perform operations comprising: receiving first image data captured by a first image sensor of stereo image sensors; receiving second image data captured by a second image sensor of the stereo image sensors; receiving depth data captured by a depth sensor, the depth data associated with a portion of at least one of the first image data or the second image data; inputting the first image data into a machine learning model; receiving, from the machine learning model, predicted depth information associated with the first image data; determining, based at least in part on the predicted depth information and the second image data, reconstructed first image data; determining a first difference between the first image data and the reconstructed first image data; determining a second difference between the predicted depth information and the depth data; determining a loss based at least in part on the first difference and the second difference; and adjusting, based at least in part on the loss, a parameter of the machine learning model to generate a trained machine learned model.

P: The one or more non-transitory computer-readable media of paragraph O, the operations further comprising sending the trained machine learned model to an autonomous vehicle for controlling the autonomous vehicle.

Q: The one or more non-transitory computer-readable media of paragraph O or P, wherein the first difference comprises at least one of: a pixel loss; a smoothing loss; or a structural similarity loss.

R: The one or more non-transitory computer-readable media of any of paragraphs O-Q, wherein the predicted depth information is associated with discrete depth values.

S: The one or more non-transitory computer-readable media of any of paragraphs O-R, wherein the predicted depth information is first predicted depth information, the operations further comprising: inputting the second image data into the machine learning model; receiving, from the machine learning model, second predicted depth information associated with the second image data; determining, based at least in part on the second predicted depth information and the first image data, reconstructed second image data; determining a third difference between the second image data and the reconstructed second image data; and determining the loss further based at least in part on the third difference.

T: The one or more non-transitory computer-readable media of any of paragraphs O-S, the operations further comprising: receiving semantic information associated with an object represented in at least one of the first image data or the second image data; wherein the loss is based at least in part on the semantic information.

U: A system comprising: one or more processors; and one or more non-transitory computer-readable media storing computer-executable instructions that, when executed, cause the one or more processors to perform operations comprising: receiving image data captured by stereo image sensors, the image data comprising left image data captured by a left image sensor and right image data captured by a right image sensor; receiving lidar data captured by a lidar sensor, the lidar data associated with a portion of the image data; inputting the left image data into a machine learning model; receiving, from the machine learning model, predicted disparity information and predicted depth information associated with the left image data; determining, based at least in part on the predicted disparity information and the right image data, reconstructed left image data; determining a first difference between the left image data and the reconstructed left image data; determining a second difference between the predicted depth information and the lidar data; determining a third difference between the predicted disparity information and the predicted depth information; determining a weight associated with at least one of the first difference, the second difference, or the third difference; determining, a loss based at least in part on the first difference, the second difference, the third difference, and the weight; and training, based at least in part on the loss, the machine learning model to generate a trained machine learned model.

V: The system of paragraph U, the operations further comprising: determining an intermediate output of the machine learning model based at least in part on shape-based upsampling; wherein the at least one of the predicted disparity information or the predicted depth information is based at least in part on the intermediate output.

W: The system of paragraph U or V, wherein the third difference represents a consistency loss.

X: The system of any of paragraphs U-W, wherein the weight is a learned weight based at least in part on an uncertainty.

Y: The system of any of paragraphs U-X, the operations further comprising sending the trained machine learned model to an autonomous vehicle for controlling the autonomous vehicle.

Z: A method comprising: receiving first image data captured by a first image sensor comprising a first field of view; receiving second image data captured by a second image sensor comprising a second field of view, wherein at least a portion of the first field of view is associated with at least a portion of the second field of view; receiving depth data captured by a depth sensor, the depth data associated with a portion of at least one of the first image data or the second image data; inputting the first image data into a machine learning model; receiving, from the machine learning model, predicted disparity information and predicted depth information associated with the first image data; determining, based at least in part on the predicted disparity information and the second image data, reconstructed first image data; determining a first difference between the first image data and the reconstructed first image data; determining a second difference between the predicted depth information and the depth data; determining, a loss based at least in part on the first difference and the second difference; and adjusting, based at least in part on the loss, a parameter of the machine learning model to generate a trained machine learned model.

AA: The method of paragraph Z, further comprising sending the trained machine learned model to an autonomous vehicle for controlling the autonomous vehicle.

AB: The method of paragraph Z or AA, wherein the predicted depth information comprises at least one of: depth data; inverse depth data; or disparity data.

AC: The method of any of paragraphs Z-AB, further comprising: determining a third difference between the predicted disparity information and the predicted depth information; and determining the loss further based at least in part on the third difference.

AD: The method of paragraph AC, wherein the third difference represents a consistency loss.

AE: The method of any of paragraphs Z-AD, further comprising: determining a weight associated with at least one of the first difference or the second difference; and determining the loss further based at least in part on the weight.

AF: The method of paragraph AE, wherein the weight is a learned weight based at least in part on an uncertainty.

AG: The method of any of paragraphs Z-AF, wherein determining the reconstructed first image data comprises warping the second image data based at least in part on the predicted disparity information.

AH: The method of any of paragraphs Z-AG, wherein the first difference comprises at least one of: a pixel loss; or a structural similarity loss.

AI: One or more non-transitory computer-readable media storing instructions executable by one or more processors, wherein the instructions, when executed, cause the one or more processors to perform operations comprising: receiving first image data captured by a first image sensor comprising a first field of view; receiving second image data captured by a second image sensor comprising a second field of view, wherein at least a portion of the first field of view is associated with at least a portion of the second field of view; receiving depth data captured by a depth sensor, the depth data associated with a portion of at least one of the first image data or the second image data; inputting the first image data into the machine learning model; receiving, from the machine learning model, predicted disparity information and predicted depth information associated with the first image data; determining, based at least in part on the predicted disparity information and the second image data, reconstructed first image data; determining a first difference between the first image data and the reconstructed first image data; determining a second difference between the predicted depth information and the depth data; determining a third difference between the predicted disparity information and the predicted depth information; determining a weight associated with at least one of the first difference, the second difference, or the third difference; determining, a loss based at least in part on the first difference, the second difference, the third difference, and the weight; and adjusting, based at least in part on the loss, a parameter of the machine learning model to generate a trained machine learned model.

AJ: The one or more non-transitory computer-readable media of paragraph AI, wherein the predicted depth information is based at least in part on shape-based upsampling.

AK: The one or more non-transitory computer-readable media of paragraph AI or AJ, wherein the weight is a first weight associated with the first difference, the operations further comprising: determining a second weight associated with at least one of the second difference or the third difference, wherein the second weight is different than the first weight; and determining the loss further based at least in part on the second weight.

AL: The one or more non-transitory computer-readable media of paragraph AK, wherein the first weight and the second weight are learned weights.

AM: The one or more non-transitory computer-readable media of any of paragraphs AI-AL, the operations further comprising: receiving semantic information associated with an object represented in at least one of the first image data or the second image data; wherein the loss is based at least in part on the semantic information.

AN: The one or more non-transitory computer-readable media of paragraph AM, wherein: the semantic information comprises at least one of a static classification, a dynamic classification, or an object type classification.

While the example clauses described above are described with respect to one particular implementation, it should be understood that, in the context of this document, the content of the example clauses can also be implemented via a method, device, system, computer-readable medium, and/or another implementation. Additionally, any of examples A-AN may be implemented alone or in combination with any other one or more of the examples A-AN.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing computer-executable instructions that, when executed, cause the one or more processors to perform operations comprising:
receiving image data captured by stereo image sensors, the image data comprising left image data captured by a left image sensor and right image data captured by a right image sensor;
receiving lidar data captured by a lidar sensor, the lidar data associated with a portion of the image data;
inputting the left image data into a machine learning model;
receiving, from the machine learning model, predicted disparity information and predicted depth information associated with the left image data, wherein the predicted depth information comprises at least one of depth data, inverse depth data, or disparity data;
determining, based at least in part on the predicted disparity information and the right image data, reconstructed left image data;
determining a first difference between the left image data and the reconstructed left image data;
determining a second difference between the predicted depth information and the lidar data;
determining a third difference between the predicted disparity information and the predicted depth information;
determining a weight associated with at least one of the first difference, the second difference, or the third difference;
determining, a loss based at least in part on the first difference, the second difference, the third difference, and the weight;
training, based at least in part on the loss, the machine learning model to generate a trained machine learned model;
sending the trained machine learned model to an autonomous vehicle for controlling the autonomous vehicle.

2. The system of claim 1, the operations further comprising:
determining an intermediate output of the machine learning model based at least in part on shape-based upsampling;
wherein the at least one of the predicted disparity information or the predicted depth information is based at least in part on the intermediate output.

3. The system of claim 1, wherein the third difference represents a consistency loss.

4. The system of claim 1, wherein the weight is a learned weight based at least in part on an uncertainty.

5. A method comprising:
receiving first image data captured by a first image sensor comprising a first field of view;
receiving second image data captured by a second image sensor comprising a second field of view, wherein at least a portion of the first field of view is associated with at least a portion of the second field of view;
receiving depth data captured by a depth sensor, the depth data associated with a portion of at least one of the first image data or the second image data;
inputting the first image data into a machine learning model;
receiving, from the machine learning model, predicted disparity information and predicted depth information associated with the first image data, wherein the predicted depth information comprises at least one of depth data, inverse depth data, or disparity data;
determining, based at least in part on the predicted disparity information and the second image data, reconstructed first image data;
determining a first difference between the first image data and the reconstructed first image data;
determining a second difference between the predicted depth information and the depth data;
determining, a loss based at least in part on the first difference and the second difference;
adjusting, based at least in part on the loss, a parameter of the machine learning model to generate a trained machine learned model; and
sending the trained machine learned model to an autonomous vehicle for controlling the autonomous vehicle.

6. The method of claim 5, further comprising:
determining a third difference between the predicted disparity information and the predicted depth information; and
determining the loss further based at least in part on the third difference.

7. The method of claim 6, wherein the third difference represents a consistency loss.

8. The method of claim 5, further comprising:
determining a weight associated with at least one of the first difference or the second difference; and
determining the loss further based at least in part on the weight.

9. The method of claim 8, wherein the weight is a learned weight based at least in part on an uncertainty.

10. The method of claim 5, wherein determining the reconstructed first image data comprises warping the second image data based at least in part on the predicted disparity information.

11. The method of claim 5, wherein the first difference comprises at least one of:
a pixel loss; or
a structural similarity loss.

12. One or more non-transitory computer-readable media storing instructions executable by one or more processors, wherein the instructions, when executed, cause the one or more processors to perform operations comprising:
receiving first image data captured by a first image sensor comprising a first field of view;
receiving second image data captured by a second image sensor comprising a second field of view, wherein at least a portion of the first field of view is associated with at least a portion of the second field of view;
receiving depth data captured by a depth sensor, the depth data associated with a portion of at least one of the first image data or the second image data;
inputting the first image data into the machine learning model;
receiving, from the machine learning model, predicted disparity information and predicted depth information associated with the first image data, wherein the predicted depth information comprises at least one of depth data, inverse depth data, or disparity data;
determining, based at least in part on the predicted disparity information and the second image data, reconstructed first image data;
determining a first difference between the first image data and the reconstructed first image data;
determining a second difference between the predicted depth information and the depth data;
determining a third difference between the predicted disparity information and the predicted depth information;
determining a weight associated with at least one of the first difference, the second difference, or the third difference;
determining, a loss based at least in part on the first difference, the second difference, the third difference, and the weight;
adjusting, based at least in part on the loss, a parameter of the machine learning model to generate a trained machine learned model; and
sending the trained machine learned model to an autonomous vehicle for controlling the autonomous vehicle.

13. The one or more non-transitory computer-readable media of claim 12, wherein the predicted depth information is based at least in part on shape-based upsampling.

14. The one or more non-transitory computer-readable media of claim 12, wherein the weight is a first weight associated with the first difference, the operations further comprising:
determining a second weight associated with at least one of the second difference or the third difference, wherein the second weight is different than the first weight; and
determining the loss further based at least in part on the second weight.

15. The one or more non-transitory computer-readable media of claim 14, wherein the first weight and the second weight are learned weights.

16. The one or more non-transitory computer-readable media of claim 12, the operations further comprising:
receiving semantic information associated with an object represented in at least one of the first image data or the second image data;
wherein the loss is based at least in part on the semantic information.

17. The one or more non-transitory computer-readable media of claim 16, wherein:
the semantic information comprises at least one of a static classification, a dynamic classification, or an object type classification.

* * * * *